Sept. 2, 1969
J. F. THULL
3,464,537
ANTIJAMMING DEVICE FOR PUBLICATION CONVEYOR
Filed Oct. 17, 1967
3 Sheets-Sheet 2
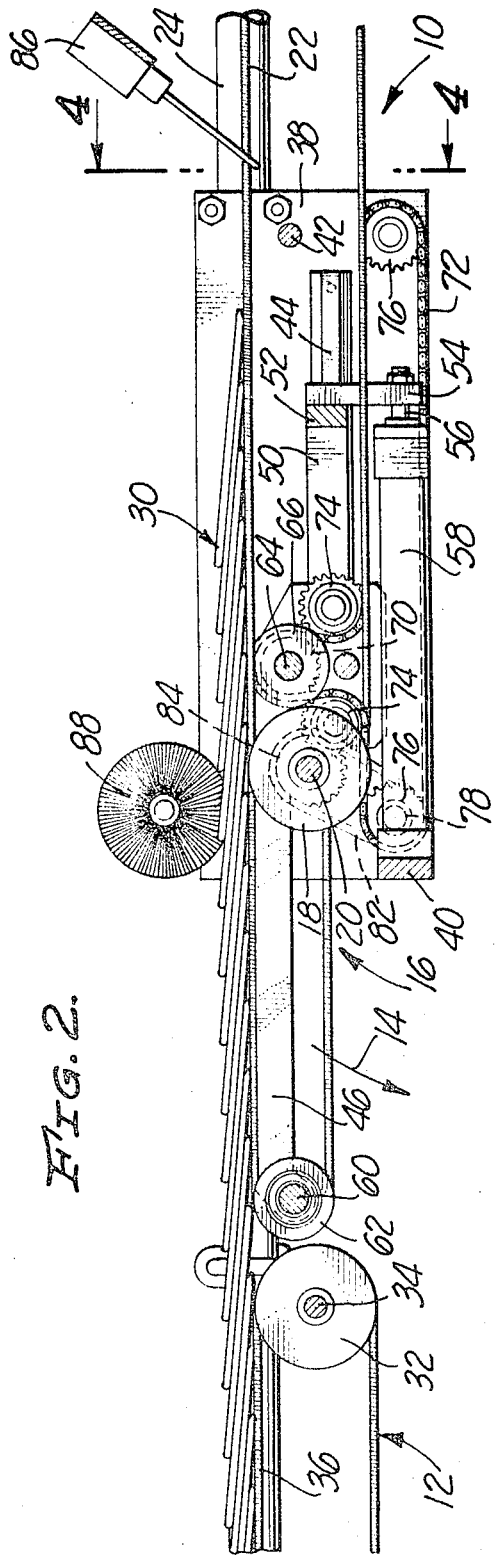
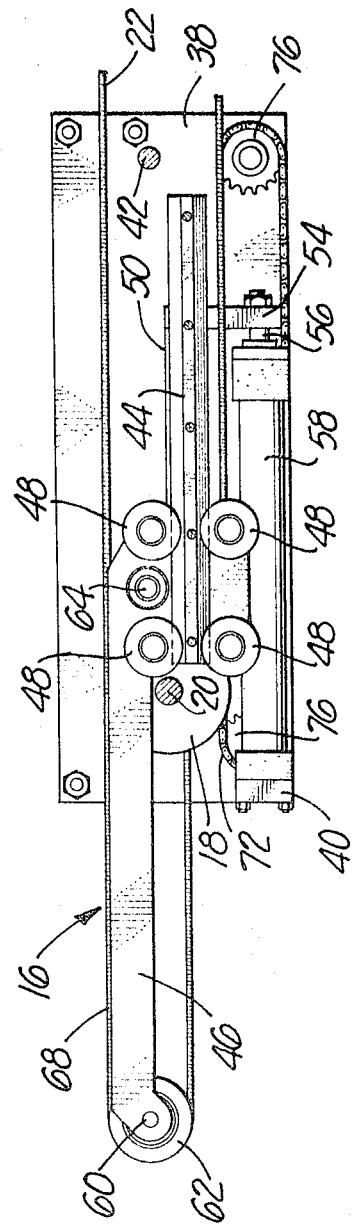
INVENTOR
JOHN F. THULL
BY
MAHONEY & HORNBAKER
ATTORNEY Sept. 2, 1969   J. F. THULL   3,464,537
ANTIJAMMING DEVICE FOR PUBLICATION CONVEYOR
Filed Oct. 17, 1967   3 Sheets-Sheet 3

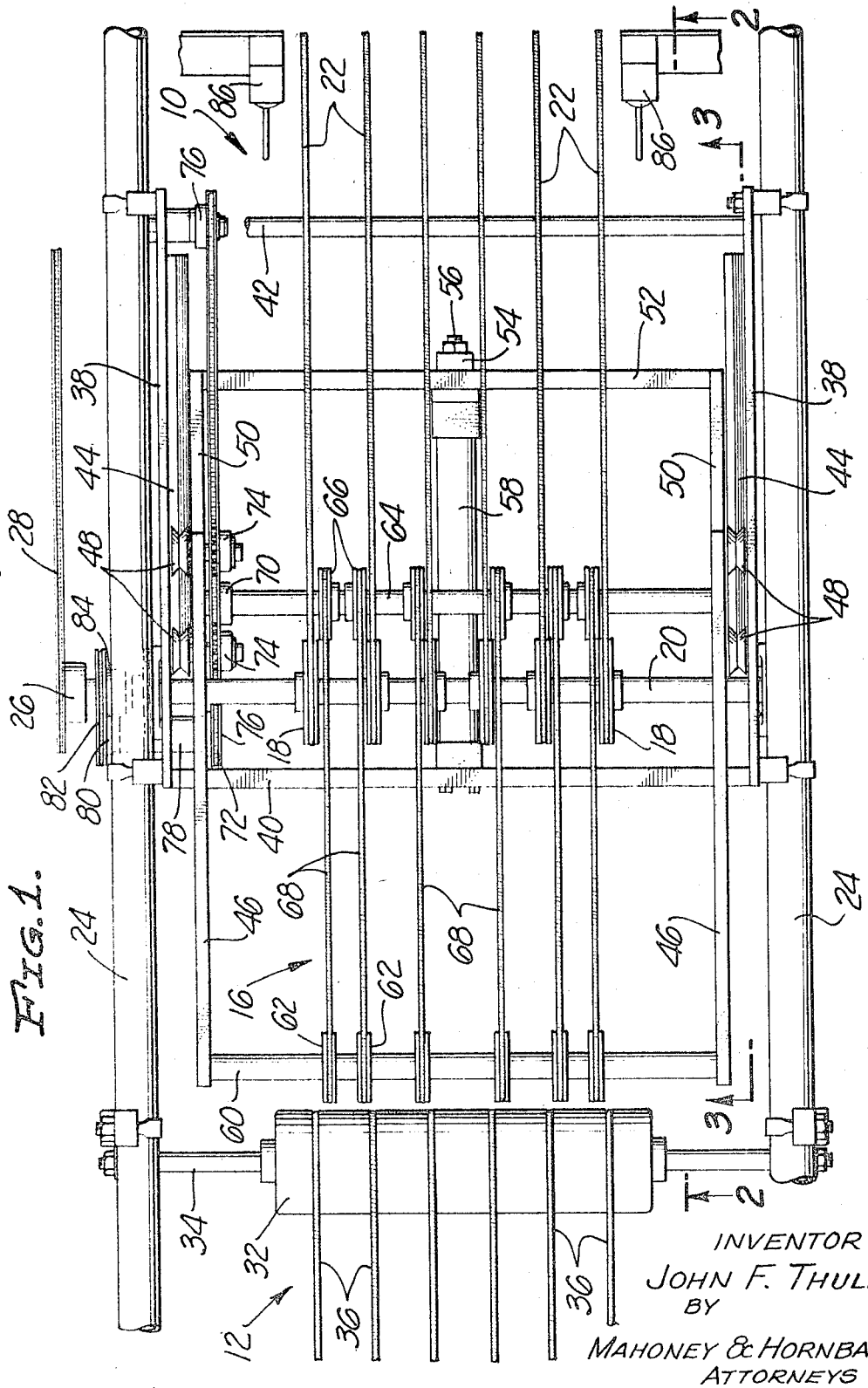

INVENTOR
JOHN F. THULL
BY
MAHONEY & HORNBAKER
ATTORNEYS

United States Patent Office 3,464,537
Patented Sept. 2, 1969

3,464,537
ANTIJAMMING DEVICE FOR PUBLICATION CONVEYOR
John F. Thull, Costa Mesa, Calif., assignor to Sta-Hi Corporation, Newport Beach, Calif., a corporation of California
Filed Oct. 17, 1967, Ser. No. 675,880
Int. Cl. B65g 15/12, 37/00
U.S. Cl. 198—89                                    12 Claims

ABSTRACT OF THE DISCLOSURE

A dumping gap is provided in a conveyor used for conveying a continuous longitudinal stream of imbricated publications, said gap normally being bridged by a dumping conveyor section roller mounted for selective parallel movement relative to a preceding main conveyor section by a fluid cylinder out of and opening said dumping gap upon a jam in said imbricated publication stream being detected. Separate conveying belts on the dumping conveyor section move constantly regardless of the position of said dumping section, and said dumping section is movable back into said dumping gap faster than the speed of movement of said imbricated publication stream.

Background of the invention

This invention relates to an antijamming device for a publication conveyor and more particularly, to a publication conveyor for conveying a continuous stream of imbricated publications along a longitudinal path wherein a dumping conveyor section normally bridges a dumping gap in the conveyor to convey the continuous stream of imbricated publications thereacross, but upon a jam in said publication stream ahead of said dumping gap being detected, the dumping conveyor section may be moved out of said dumping gap to permit the publication stream to flow downwardly through said dumping gap, rather than continue along said conveyor. Even more particularly, this invention relates to a publication conveyor of the foregoing general character wherein the provision of the dumping conveyor section in the conveyor line is accomplished in a new and unique manner so as not to appreciably increase the vertical space requirements of the conveyor, either for the provision of said dumping conveyor section or the operation thereof, over that normally required for a similar conveyor not having said dumping conveyor section and the advantages thereof.

Also according to the principles of the present invention, the dumping conveyor section is uniquely formed and supported operably removable from the dumping gap upon a jam being detected in the publication stream without increasing said jam during such withdrawal or the opening of the dumping gap, as well as replaceable across said dumping gap in position for normally conveying said publication stream without causing a rejam of the publication stream during such replacement and despite the fact that during such withdrawal and replacement, the conveying of such publication stream at all times continues.

It has long been common practice in the printing industry to continuously print, fold and convey a stream of overlapped or imbricated publications to a final stacking station or a station where further printing, folding or binding operations might be performed on the particular publications. For instance, in the newspaper printing industry, after printing and folding, an imbricated stream of said newspapers is conveyed continuously along a longitudinally extending conveyor to a stacking station where the newspapers are automatically received and stacked, with the stacks being conveyed to a point of loading for distribution thereof. As stated, this entire sequential operation is carried out completely automatically and at extremely high speed.

In view of the extremely high speeds involved, it is inevitable that sticking or maladjustments of equipment or momentary malfunctions of equipment can cause misalignments and jamming of the continuously moving stream of newspapers and particularly in the conveyor line ultimately depositing the newspapers into the stacking equipment. In view of the extremely high speed of movement of the stream of publications, unless such jamming is immediately detected and eliminated, such publication jam can increase along the length of the conveyor line and ultimately progress into the stacking equipment, resulting in a shutdown of the entire printing, folding, conveying, stacking and distribution line and further resulting in a relatively long period of maintenance necessary for the clearing of the conveying line and stacking equipment.

In order to avoid the serious consequences of such a jam occurring, certain of the prior publication conveyors have been provided with detecting devices which automatically detect the misalignment of publications in the conveyed stream which will detect the initial buildup of a jam in said stream. Furthermore, such detecting devices have frequently been arranged so as to immediately shut down the entire printing line with the various described included components thereof. Although shutting down the entire printing line does interrupt the operation thereof, such shutdown at least prevents the extensive buildup of a publication jam and makes the correction thereof relatively easy so as to minimize the delay in the printing operations.

Certain other of the prior printing and conveying equipmen has included not only the foregoing detecting means for detecting misalignments in the stream of printed publications, but has also included in the conveyor line a built-in dumping gap normally bridged by a dumping conveyor section. The dumping conveyor section is constructed so that upon the detection of a jam in the publication stream ahead of said dumping gap, the dumping conveyor section is automatically moved to open said gap. Upon the opening of said dumping gap, the continuously moving stream of publications, rather than be conveyed on to the stacking equipment, is directed downwardly through said gap until the jam has been eliminated, at which time the dumping conveyor section automatically closes and the normal conveying of the publication stream continues.

One of the principal difficulties with these prior dumping conveyor sections and the particular mounting thereof has been that the required path of action thereof for opening the dumping gap his required increased vertical space for the overall publication conveyor. Such increased vertical space requirement can be extremely critical in a complex printing line.

A further objection to the prior dumping gap and dumping conveyor section arrangements has been the fact that the movements of the dumping conveyor section have not been sufficiently positive and quick, not only in the opening movement for exposing the dumping gap to commence the dumping therethrough of the continuous publication stream, but more important, in the closing of such gap in such a manner so as to eliminate the possibility of a rejam of the publication stream merely as a result of such closing.

Objects and summary of the invention

It is, therefore, an object of my invention to provide an antijamming device for a publication conveyor generally comprising a dumping conveyor section in the conveyor line selectively movable between bridging a dumping gap or opening said gap of the general character hereinbefore discussed wherein such dumping conveyor section is constructed and mounted in such a manner so as to not appreciably increase the vertical space requirements for the conveyor line or for the opening and closing operation action of said dumping conveyor section.

According to the principles of the present invention, the dumping conveyor section is mounted movable in said opening and closing movements relative to the main conveyor section in a plane parallel to said main conveyor section so that not only are the vertical space requirements of the overall conveyor line not appreciably increased, but it is unnecessary to overcome gravitational forces caused by the weight of the dumping section permitting the opening and closing movement thereof to be accomplished much more quickly and positively in a closely controlled manner.

It is a further object of my invention to provide an anti-jamming device for a publication conveyor of the foregoing general character wherein the dumping conveyor section is supported and arranged movable in such a manner so as to close for rebridging the dumping gap without the possibility of causing a rejam of the continuous publication stream along the particular conveyor line. Not only is the movement of the dumping conveyor section parallel to the main conveyor section, but preferably the dumping section movement telescopes said dumping section into a main conveyor section upstream of the continuously moving stream of publications being conveyed during the movement of said dumping section to open the dumping gap. Thus, in movement of said dumping conveyor section for reclosing said dumping gap, the dumping section moves with the direction of flow of the publication stream, thereby carrying the continuously moving publication stream smoothly across the dumping gap to recomplete the conveyor line and smoothly eliminate said dumping gap.

Furthermore, and according to cerain of the particulars of the present invention, the moving of the dumping conveyor section across the dumping gap to recomplete the conveyor line and bridge said dumping gap is preferably accomplished at a speed faster than the normal speed of movement of the continuously flowing publication stream so as to eliminate any possibility of a rejam in said publication stream being created. Also, it is preferred to provide the dumping conveyor section with separate conveying means thereon, such as conveyor belts, which is constantly operable despite the particular position or movement of said dumping section. For instance, constantly moving conveyor belts may be provided on the dumping conveyor section, which conveyor belts are at all times moving and are particularly moving during the closing or rebridging movement of said dumping section, thereby even further minimizing any possibility of a rejam of the publication stream during said dumping section closing movement.

Other objects and advantages of the invention will be apparent from the following specification and the accompanying drawings which are for the purpose of illustration only.

Brief description of the drawings

FIG. 1 is a fragmentary, top plan view of a conveyor line incorporating an embodiment of the dumping conveyor section of the present invention, with certain parts thereof removed for clarity of illustration and with said dumping conveyor section in closed or dumping gap bridging position;

FIG. 2 is a fragmentary, vertical, sectional view looking in the direction of the arrows 2—2 in FIG. 1;

FIG. 3 is a fragmentary, vertical, sectional view looking in the direction of the arrows 3—3 in FIG. 1;

Description of the best embodiment contemplated

Figure 5:
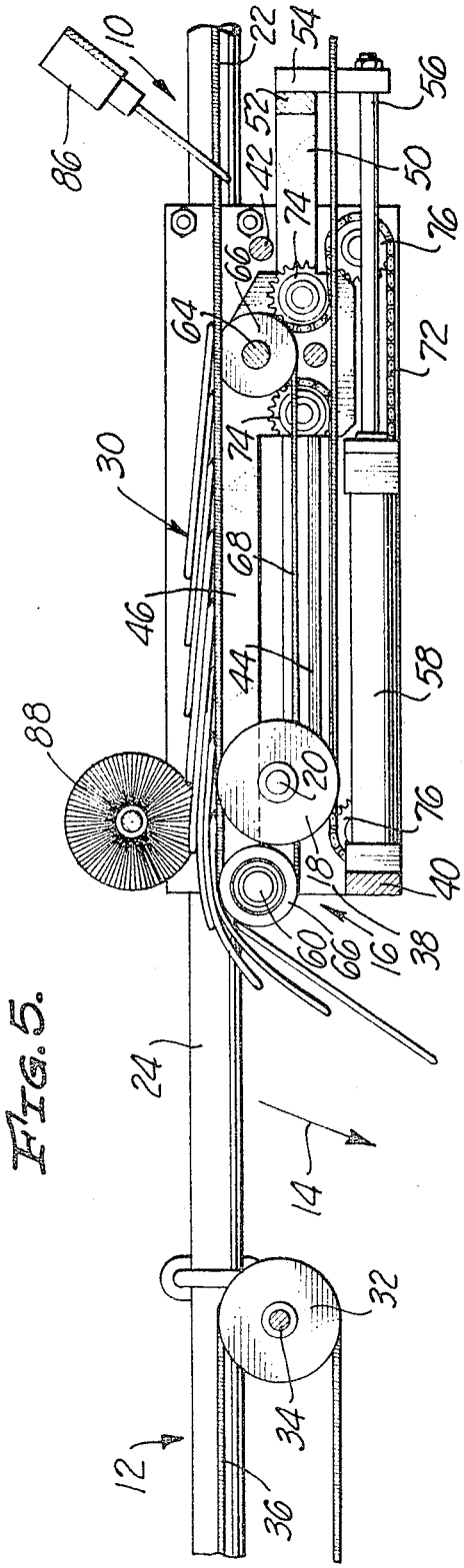
FIG. 5 is a view similar to FIG. 2, but with the dumping conveyor section in open position exposing the conveyor line dumping gap.

Referring to the drawings, an embodiment of a publication conveyor for conveying a continuous stream of imbricated or overlapped publications along a longitudinal path is shown and incorporates a first or upstream main conveyor section, generally indicated at 10, a second or downstream main conveyor section, generally indicated at 12, longitudinally spaced downstream from said first main conveyor section so as to create a dumping gap, generally indicated by the down arrow 14, and a movable dumping conveyor section, generally indicated at 16, normally positioned bridging said dumping gap between said main conveyor sections.

The first or upstream main conveyor section 10 is generally of usual construction having a series of transversely spaced pulleys 18 secured to a rotatable supporting shaft 20 and longitudinally movably mounting a series of longitudinally extending coil spring conveyor belts 22. The pulley supporting shaft 20 is rotatably mounted extending transversely between a pair of longitudinally extending side rails 24, being rotatably driven by a sprocket 26 and chain 28 operably connected to usual drive means, not shown. In this manner, the conveyor belts 22 of the first main conveyor section 10 are constantly longitudinally movable for conveying longitudinally therealong a continuous stream of imbricated publications, generally indicated at 30 in FIGS. 2 and 5, said publications being, for instance, the usual folded newspapers as received from printing and folding mechanisms.

The second main conveyor section 12 is also generally of usual construction having a rotatable belt roll 32 on a transversely extending supporting shaft 34 mounted on and between the side rails 24, said belt roll in turn supporting a series of longitudinally extending, coil spring conveyor belts 36. The conveyor belts 36 are driven in any usual manner, not shown, but are necessarily synchronized in longitudinal speed with the conveyor belts 22 of the first main conveyor section 10. The second main conveyor section 12 will, therefore, continue the longitudinal conveyance of the continuous stream of imbricated publications 30 therealong as received across the dumping gap 14, as shown in FIG. 2.

More particularly to the principles of the present invention, the dumping conveyor section 16 is supported on the side rails 24 by a pair of supporting plates 38 secured to said side rails, said supporting plates in turn securing a transversely extending mounting bar 40 and a transversely extending supporting rod 42, thereby providing a rigid supporting frame for the dumping conveyor section. The supporting plates 38 also mount a pair of longitudinally extending and transversely aligned roller tracks 44, which tracks longitudinally movably support a pair of transversely spaced carriage side plates 46 through vertically spaced sets of support rollers 48. As best seen in FIGS. 1 and 3, the support rollers 48 are rotatably secured to the upstream end portions of the carriage side plates 46 so as to support said side plates generally in longitudinally downstream extending cantilever fashion.

Upstream of the support rollers 48, the carriage side plates 46 are formed with extensions 50, the upstream extremities of which mount a transversely extending positioning bar 52. A connecting plate 54 is secured transversely intermediate the positioning bar 52 extending downwardly therefrom and being secured to a piston rod 56 of a fluid cylinder 58 mounted on the previously described mounting bar 40 between the supporting plates 38. The fluid cylinder 58 is, therefore, mounted stationary, with the piston rod 56 thereof being longitudinally upstream extensible and longitudinally downstream retractable carrying the positioning bar 52 and the carriage side plates 46 therewith in such longitudinal movement, as will be hereinafter discussed more in detail.

More particularly to the conveying portion of the dumping conveyor section 16, a transversely extending pulley shaft 60 is supported between the downstream extremities of the carriage side plates 46 and rotatably supports a series of pulleys 62. Also, a pulley shaft 64 is rotatably supported extending transversely between the carriage side plates 46 generally in the longitudinal location of the support rollers 48, said pulley shaft 64 having secured thereon a series of pulleys 66 longitudinally aligned with and corresponding to the pulleys 62 of the pulley shaft 60. A series of coil spring conveyor belts 68 extend over and between the pulleys 62 and 66, said conveyor belts being continuous and extending longitudinally only between said pulleys, but most important, with the top strands of said conveyor belts extending at all times generally horizontally aligned with the conveyor belts 22 and 36 of the first and second main conveyor sections 10 and 12.

Figure 4:
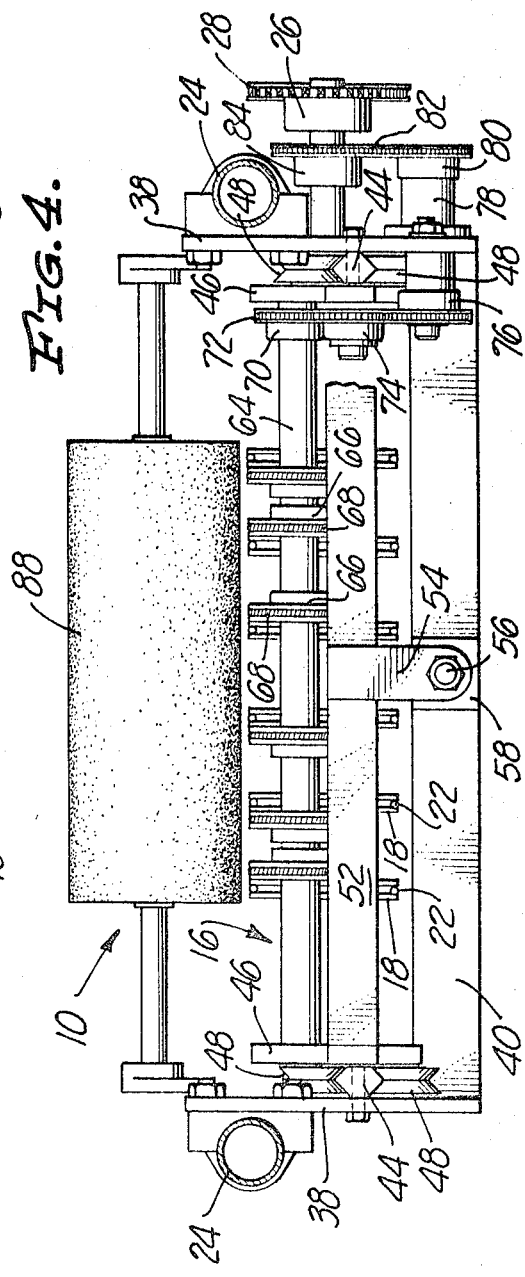
FIG. 4 is a vertical, sectional view looking in the direction of the arrows 4—4 in FIG. 2.

As stated, the pulley shaft 64 is rotatable on the carriage side plates 46 rotatably driving the pulleys 66 and longitudinally driving the conveyor belts 68, with said pulley shaft 64 being rotatably driven by a sprocket 70 at one end of said shaft, as shown, for instance, in FIGS. 1 and 4. As probably best seen FIG. 2, a drive chain 72 is engaged upwardly over the sprocket 70 and extends oppositely downwardly beneath a pair of longitudinally spaced idler sprockets 74, said idler sprockets being rotatably mounted on the adjacent carriage side plate 46. From beneath the idler sprockets 74, the drive chain 72 extends longitudinally oppositely over, downwardly around and longitudinally between a pair of sprockets 76 which are rotatably mounted on the adjacent supporting plate 38.

The downstream of the sprockets 76 is secured to a rotatable stub shaft 78 extending transversely through and rotatable relative to the adjacent supporting plate 38, as best seen in FIGS. 1 and 4. A sprocket 80 is secured to the outer end of the stub shaft 78 transversely outwardly of the adjacent side rail 24 and is engaged by a drive chain 82. The drive chain 82 extends slightly longitudinally and upwardly over a sprocket 84 secured to and rotatable by the supporting shaft 20 of the first main conveyor section 10 previously described so that said sprocket 84 is rotatably driven along with the first main conveyor section supporting shaft 20 by the main drive sprocket 26 and chain 28.

Thus, all parts of the dumping conveyor section 16 mounted on the carriage side plates 46 and including said carriage side plates are longitudinally movable through the roller tracks 44 and support rollers 48 longitudinally along the supporting plates 38 secured to the side rails 24, said longitudinal movement being selectively created by the piston rod 56 and fluid cylinder 58 for moving the dumping conveyor section 16 between a position bridging the dumping gap between the first and second main conveyor sections 10 and 12, as shown in FIGS. 1, 2 and 3, or a position opening said dumping gap 14, as shown in FIG. 5. Furthermore, in view of the unique arrangement of the sprocket 70 and idler sprockets 74 on the carriage side plate 46, the sprockets 76 on the stationary supporting plate 38 drivingly connected through the sprockets 80 and 84 to the main drive chain 28 and the looped arrangement of the drive chain 72, the conveyor belts 68 of the dumping conveyor section 16 are constantly longitudinally driven despite the particular position of the dumping conveyor section, that is, whether the dumping conveyor section is extended bridging the dumping gap 14 or retracted exposing or opening said dumping gap or at any moment therebetween.

Still further, and as probably best seen in FIGS. 1 and 4, due to the laterally offset mounting of the conveyor belts 68 on the dumping conveyor section 16 from the conveyor belts 22 on the first main conveyor section 10, as well as the other mounting arrangements between said conveyor sections, the dumping conveyor section 16 is permitted to retract telescopically upstream with the first main conveyor section 10 for opening the dumping gap 14, with the constantly moving conveyor belts 68 of the dumping conveyor section 16 always remaining generally horizontally aligned with and the movement thereof synchronized with the conveyor belts 22 of the first main conveyor section 10 as shown and described.

For purposes of detecting the buildup of a jam in the stream of publications 30, a pair of somewhat usual detecting devices 86 are preferably mounted on the side rails 24 for detecting misalignment of the lateral edges of the stream of publications, said detecting devices being preferably connected for automatically actuating the dumping conveyor section 16 when such a jam is detected. Also, a wire pressure roll 88 may be rotatably mounted overlying the stream of publications 30 at the downstream end of the first main conveyor section 10 for maintaining a constant smooth downstream flow of the stream of publications 30, either longitudinally across the dumping gap 14 or downwardly through said dumping gap, as determined by the position of the dumping conveyor section 16 and despite movement of said dumping conveyor section.

A still further feature important to certain of the principles of the present invention is the fact that the fluid cylinder 58 is provided with sufficient capacity for moving the dumping conveyor section 16 longitudinally downstream, that is, from upstream open position, as shown in FIG. 5, to downstream bridging position, as shown in FIG. 2, at a longitudinal lineal speed faster than the longitudinal lineal speed of the conveyor belts 22 and 68 on the first main conveyor section 10 and dumping conveyor section 16. As a result, the closing movement of the dumping conveyor section 16 is at a higher speed than the longitudinal flow of the stream of publications 30 so as to smoothly rebridge the dumping gap 14 between the first and second main conveyor sections 10 and 12 when the particular jam in the stream of publications has been dumped or eliminated. Such closing of the dumping gap 14 insures again a rejam of the stream of publications 30 being created by such closing movement.

first main conveyor section 10 to rebridge the dumping
In operation, therefore, with the dumping conveyor section 16 in extended bridging position, as shown in FIG. 2, the longitudinally moving stream of publications 30 will be efficiently conveyed along the first main conveyor section 10, along the dumping conveyor section 16 over the dumping gap 14 and along the second main conveyor section 12. Upon a jam being detected in the stream of publications 30 by the detecting devices 86, the dumping conveyor section 16 will be automatically longitudinally retracted telescopically upstream into the first main conveyor section 10 to open the dumping gap 14 and cause the stream of publications 30 to be dumped downwardly through said dumping gap, as shown in FIG. 5. Upon a sufficient time delay for the jam in the stream of publications 30 to be dumped through the dumping gap 14, or by manual operation, the dumping conveyor section 16 may be longitudinally re-extended downstream from the first main conveyor section 10 to rebridge the dumping gap 14 and recreate the normal conveyance of the stream of publications 30 across the dumping gap 14 along the second main conveyor section 12, said rebridging of the dumping gap 14 taking place at a sufficient speed so as to eliminate the possibility of a rejam in the stream of publications 30 being caused by such dumping conveyor section closing movement.

Although in the particular embodiment of the principles of the present invention illustrated, the dumping conveyor section 16 is shown as bridging or opening the dumping gap 14 longitudinally between the first and second main conveyor sections 10 and 12, it is not intended to limit the principles of the present invention to a dumping gap solely intermediate a continuous conveyor line. It is obvious that the principles of the present invention will apply equally as well to a dumping gap which is at the end part of a continuous conveyor line, or at any other location therein desired and where jams in a continuously moving stream of publications might be created.

Thus, the antijamming device for a publication conveyor of the present invention provides a highly efficient and positively acting dumping conveyor section 16 uniquely mounted for parallel movement relative to the main conveyor line, preferably telescoping with the preceding first main conveyor section 10 upstream of the longitudinal flow of the stream of publications 30, as illustrated. Furthermore, the antijamming device, due to the constant longitudinal movement of the conveyor belts 68 of the dumping conveyor section 16 and the particular action of the fluid cylinder 58, eliminates any possibility of a rejam in the stream of publications 30 being created by the closing movement of the dumping conveyor section 16 after the originally detected jam has been dumped or eliminated. Additionally, such constant movement of the conveyor belts 68 on the dumping conveyor section 16 provides the added advantage of not further increasing the detected jam in the stream of publications 30 during the opening of the dumping gap 14 so as to permit a quick and easy disposal of said jam through said dumping gap.

I claim:

1. In a publication conveyor for conveying a continuous stream of imbricated publications along a longitudinal path, the combination of: a first conveyor section; a second conveyor section spaced longitudinally from said first conveyor section and forming a longitudinal dumping gap therebetween, said first and second conveyor sections each having a series of transversely spaced and continuously longitudinally moving conveyor belts thereon supporting and moving said imbricated publication stream along said longitudinal path in a direction toward said second conveyor section; a dumping conveyor section mounted selectively longitudinally movable between a normal position longitudinally bridging said dumping gap and a dumping position moved longitudinally at least partially telescoped with said first conveyor section and opening said dumping gap, said dumping conveyor section having a separate series of transversely spaced and longitudinally movable belts thereon transversely offset from but at the same level as said first conveyor section conveyor belts and longitudinally partially occupying spaces transversely between said first conveyor section conveyor belts at least during said movement of said dumping conveyor section relative to said first conveyor section and in said dumping position; means operatively connected to said dumping conveyor section conveyor belts for constantly longitudinally moving said dumping conveyor section conveyor belts in substantial synchronization with said first conveyor section conveyor belts regardless of movement of said dumping conveyor section between and positioning in said normal bridging and dumping positions; means operatively associated with said dumping conveyor section for moving said section longitudinally between said normal bridging and dumping positions; and said conveyor belts of said conveyor sections conveying a continuous stream imbricated publications along said sections and across said dumping gap when said dumping conveyor section is in its normal bridging position and conveying said stream along said first conveyor section and downwardly through said dumping gap when said dumping conveyor section is moved longitudinally to its dumping position.

2. A publication conveyor as defined in claim 1 in which detecting means is operatively associated with said first and dumping conveyor sections for detecting misalignments occurring in said publication stream and automatically actuating said dumping conveyor section moving means to move said dumping conveyor section from said normal bridging to said dumping position at least partially telescoped with said first conveyor section when said detecting means detects said publication stream misalignments.

3. A publication conveyor as defined in claim 1 in which a rotatable pressure roll is mounted directly overlying and engaging said publication stream adjacent termination of said first conveyor section and preceding said dumping gap smoothly guiding said publication stream across said dumping gap when said dumping conveyor section is in said normal bridging position and downwardly through said dumping gap when said dumping conveyor section is at least partially telescoped with said first conveyor section in said dumping position.

4. A publication conveyor as defined in claim 1 in which said dumping conveyor section is roller mounted selectively movable between its normal bridging and dumping positions; and in which said means for moving said dumping conveyor section includes a fluid cylinder operatively connected to said dumping conveyor section actionable for moving said dumping conveyor section between said normal bridging and dumping positions.

5. A publication conveyor as defined in claim 1 in which said dumping conveyor section is mounted longitudinally movable telescoping into said first conveyor section into said dumping position and in the reverse direction longitudinally into said normal bridging position with said means for moving said dumping conveyor section moving said dumping conveyor section in said reverse direction into said normal bridging position at a speed faster than the speed at which said section conveyor belts convey said continuous stream of imbricated publications along said section to bridge said dumping gap at a speed faster than said publication stream movement.

6. A publication conveyor as defined in claim 1 in which said dumping conveyor section is roller mounted longitudinally movable into said dumping position at least partially telescoped with said first conveyor section and in a reverse direction longitudinally into said normal bridging position; and in which said means for moving said dumping conveyor section includes a fluid cylinder operatively connected to said dumping conveyor section and moving said dumping conveyor section longitudinally in said reverse direction into said normal bridging position at a speed faster than the speed at which said conveyor belts of said sections convey said continuous stream of imbricated publications along said sections to bridge said dumping gap at a speed faster than said publication stream movement.

7. In a publication conveyor for conveying a continuous stream of imbricated publications along a longitudinal path, the combination of: a conveyor line including at least one main conveyor section terminating at a longitudinal dumping gap; said main conveyor section having a series of transversely spaced and continuously longitudinally moving conveyor belts thereon supporting and moving said imbricated publication stream along said longitudinal path in a direction toward said dumping gap; a dumping conveyor section mounted selectively longitudinally movable between a normal position longitudinally bridging said dumping gap and a dumping position moved longitudinally at least partially telescoped with said main conveyor section and opening said dumping gap, said dumping conveyor section having a separate series of transversely spaced and longitudinally movable conveyor belts thereon transversely offset from but at the same level as said main conveyor section conveyor belts and longitudinally partially occupling spaces transversely between said main conveyor section conveyor belts at least during said movement of said dumping conveyor section relative to said main conveyor section and in said dumping position; means operatively connected to said dumping conveyor section conveyor belts for constantly longitudinally moving said dumping conveyor section conveyor belts in substantial synchronization with said main conveyor section conveyor belts regardless of movement of said dumping conveyor section between and positioning in said normal bridging and dumping positions; means operatively associated with said dumping conveyor section for moving said section longitudinally between said normal bridging and dumping positions; and said conveyor belts of said conveyor sections conveying a continuous stream of imbricated publications along said sections and across said dumping gap when said dumping conveyor section is in its normal bridging position and for conveying said stream along said main conveyor section and downwardly through said dumping gap when said dumping conveyor section is moved longitudinally to its dumping position.

8. A publication conveyor as defined in claim 7 in which detecting means is operatively associated with said main and dumping conveyor sections for detecting misalignments occurring in said publication stream and automatically actuating said dumping conveyor section-moving means to move said dumping conveyor section from said normal bridging to said dumping position at least partially telescoped with said main conveyor section when said detecting means detects said publication stream misalignments.

9. A publication conveyor as defined in claim 7 in which a rotatable pressure roll is mounted directly overlying and engaging said publication stream adjacaent termination of said main conveyor section and preceding said dumping gap smoothly guiding said publication stream across said dumping gap when said dumping conveyor section is in said normal bridging position and downwardly through saiad dumping gap when said dumping conveyor section is at least partially telescoped with said main conveyor section in said dumping position.

10. A publication conveyor as defined in claim 7 in which said moving means is consrtucted and arranged for moving said dumping conveyor section longitudinally from said dumping into said normal bridging position at a speed faster than said conveyor belts of said sections convey said continuous stream of imbricated publications along said sections to bridge said dumping gap at a speed faster than said publication stream movement.

11. A publication conveyor as defined in claim 7 in which said dumping conveyor section is roller mounted movable longitudinally into said main conveyor section into said dumping position and in a reverse direction longitudinally into said normal bridging position; and in which said moving means includes fluid cylinder means for longitudinally moving said dumping conveyor section, said fluid cylinder means being constructed and arranged for moving said dumping conveyor section longitudinally in said reverse direction at a speed greater than said conveying of said continuous stream of imbricated publications along said sections by said conveyor belts to bridge said dumping gap at a speed faster than said publications stream movement.

12. A publication conveyor as defined in claim 7 in which said dumping conveyor section is mounted movable longitudinally telescoping into said main conveyor section into said dumping position and in a reverse direction into said normal bridging position with said means moving said dumping conveyor section being constructed and arranged for moving said dumping conveyor section longitudinally in said reverse direction at a speed faster than said conveying of said continuous stream of imbricated publications along said sections by said conveyor belts to bridge said dumping gap at a speed faster than said publication stream movement; and in which a rotatable pressure roller is mounted directly overlying and engaging said publication stream adjacent termination of said main conveyor section and preceding said dumping gap smoothly guiding said publication stream across said dumping gap when said dumping conveyor section is in said normal bridging position and downwardly through said dumping gap when said dumping conveyor section is in said dumping position.

References Cited

UNITED STATES PATENTS

| 790,239 | 5/1905 | Wood | 198—89 |
| 3,003,611 | 10/1961 | Pelzer | 198—139 |
| 3,006,454 | 10/1961 | Penn | 198—89 |
| 3,150,761 | 9/1964 | Pinault. | |

FOREIGN PATENTS 56,179    4/1944    Netherlands.

RICHARD E. AEGERTER, Primary Examiner

U.S. Cl. X.R.

198—139, 190